United States Patent [19]

Tanaka et al.

[11] Patent Number: 4,881,169
[45] Date of Patent: Nov. 14, 1989

[54] APPARATUS FOR CONTROLLING PERIPHERAL EQUIPMENT

[75] Inventors: Shigenobu Tanaka; Tomohisa Arai, both of Tokyo, Japan

[73] Assignee: NEC Corporation, Tokyo, Japan

[21] Appl. No.: 118,015

[22] Filed: Nov. 9, 1987

[30] Foreign Application Priority Data

Nov. 10, 1986 [JP] Japan ............................. 61-268218

[51] Int. Cl.⁴ ............................................... G06F 3/00
[52] U.S. Cl. ................................ 364/200; 364/236.2; 364/238.4; 364/248.1
[58] Field of Search ..................... 364/200, 300, 900; 360/78.07

[56] References Cited

U.S. PATENT DOCUMENTS 4,677,507  6/1987  Elliott .............................. 360/78.07

Primary Examiner—Raulfe B. Zache
Attorney, Agent, or Firm—Foley & Lardner, Schwartz, Jeffery, Schwaab, Mack, Blumenthal & Evans

[57] ABSTRACT

An apparatus for controlling peripheral equipment includes a circuit for driving the peripheral equipment, first and second registers for storing conditions under which the peripheral equipment is operated, and a timer for counting a time of operation of the peripheral equipment based on data stored in the second register. The content of the first register is written into the second when all zeros are stored in the latter. When the counted time becomes equal to a predetermined time, a time over signal, indicating that an operation time of a specific piece of peripheral equipment is longer than a normal operation time, is produced so that it is possible for a single common timer to count the operation time of a plurality of peripheral equipment.

5 Claims, 4 Drawing Sheets

APPARATUS FOR CONTROLLING PERIPHERAL EQUIPMENT

FIELDS OF THE INVENTION

The invention relates to an apparatus for controlling peripheral equipment, and more particularly to an apparatus for controlling peripheral equipment in which operation time of peripheral equipment such as a seek time of disc drives is counted to be compared with a predetermined operation time.

BACKGROUND OF THE INVENTION

One conventional apparatus for controlling peripheral equipment which is adapted to control, for instance, disc drives comprises a processor for controlling a plurality of disc drives, and a plurality of timers each counting a seek time of a corresponding one of the disc drives.

In operation, a control signal is supplied from the processor to one of the disc drives whereby a head is controlled to move from an original track to a designated track on a recording medium like a magnetic disc or an optical disc so that information is read from the recording medium or written thereinto. In the control of the disc drive, a timer counts a seek time during which the head moves from the original track to the designated track whereby the counted time is compared with a predetermined time. In a case where the head can not seek the designated track in the predetermined time, the processor produces a control signal again to re-control a corresponding disc drive so that the head moves again toward the designated track. When the head can not reach the designated track even after a predetermined number of addressing trials, the disc drive is detected to be "failed".

According to the conventional apparatus for controlling peripheral equipment, however, there has been a disadvantage that the amount of hardware is increased because a plurality of timers are provided independently in each of the disc drives. As a result, the number of disc drives which can be controlled by one semiconductor chip disc controller is limited. Further, means for controlling the plurality of timers becomes vary complicated.

SUMMARY OF THE INVENTION

Accordingly, it is an object of the invention to provide an apparatus for controlling peripheral equipment in which a single timer is provided to count a seek time for a plurality of peripheral equipment, like disc drives.

It is a further object of the invention to provide an apparatus for controlling peripheral equipment in which peripheral equipment, like disc drives, which can be controlled by one semiconductor chip controller are increased in number.

It is a still further object of the invention to provide an apparatus for controlling peripheral equipment in which a very complicated means for controlling a plurality of timers is not necessary.

According to the invention, an apparatus for controlling peripheral equipments comprises, driving means for driving a plurality of peripheral equipment, first means for storing information indicating which peripheral equipment is under a predetermined operation among said plurality of peripheral equipment, some of said information being erased therein when one of said plurality of peripheral equipment finishes said predetermined operation, second means for storing said information from said first means when there is stored no information therein, some of said information being erased when one of said plurality of peripheral equipment finishes said predetermined operation, and a timer for counting a time during which said information is stored in said second means to compare said time with a predetermined time, wherein said timer produces a time over signal when said time becomes equal to said predetermined time.

BRIEF DESCRIPTION OF THE DRAWINGS

The invention will be explained in more detail in accordance with following drawing, wherein.

DESCRIPTION OF THE PREFERRED EMBODIMENTS

Figure 1:
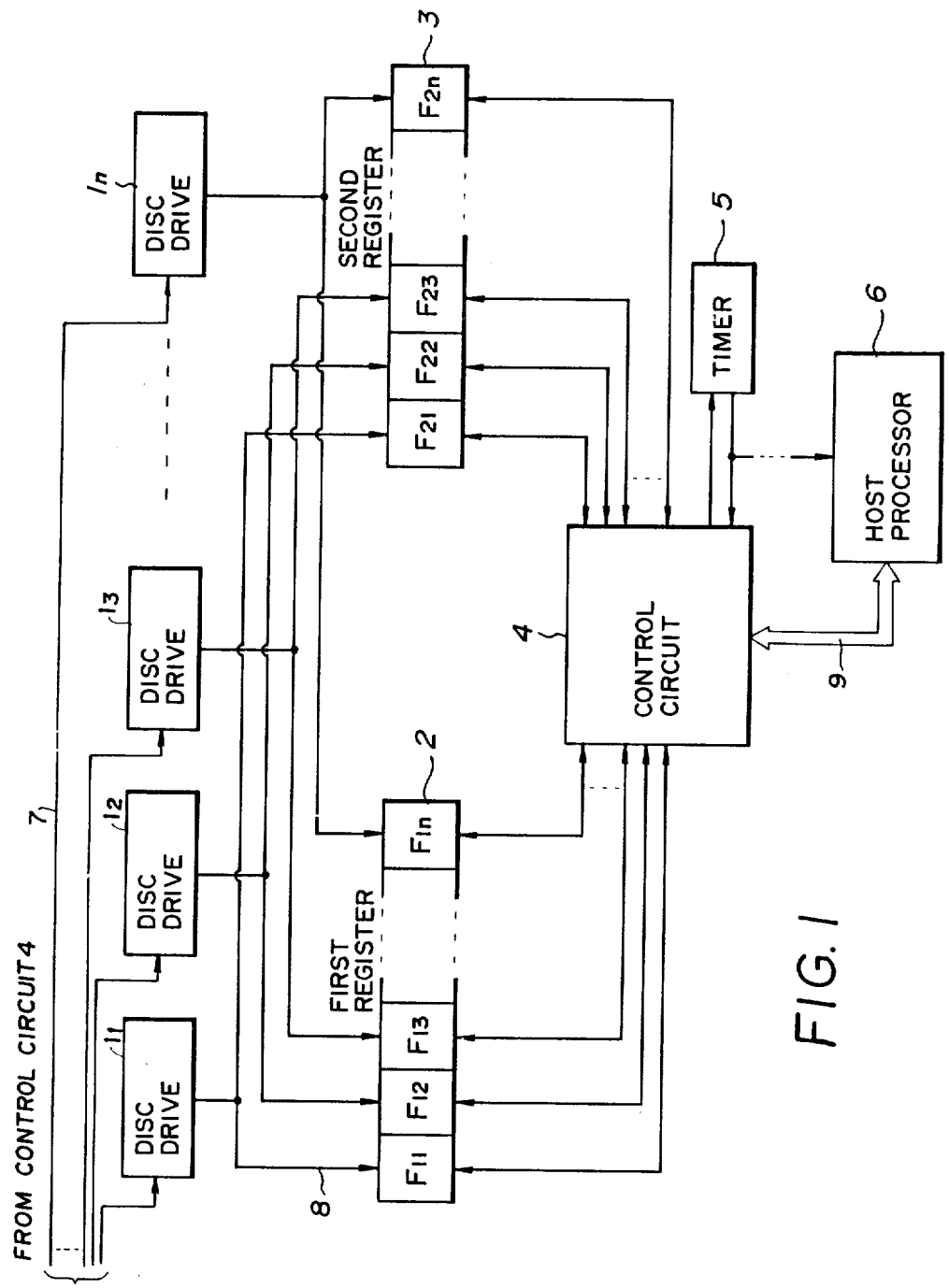
FIG. 1 is a block diagram showing an apparatus for controlling peripheral equipment in a first embodiment according to the invention.

In FIG. 1, there is shown an apparatus for controlling peripheral equipment comprising a plurality of disc drives $1_1$, $1_2$, $1_3$ —$1n$ each driving a head (not shown) to move from an original track to a designated track on a magnetic disc or optical disc, a first register 2 having flags $F_{11}$, $F_{12}$, $F_{13}$ —$F_{1n}$ of n bits respectively connected through signal lines 8 to the disc drives $1_1$, $1_2$, $1_3$ —$1n$ which become "1" when the corresponding disc drive $1k$ ($k=1, 2, 3$—$n$) is under a seek operation, and a second register 3 having flags $F_{21}$, $F_{22}$, $F_{23}$ —$F_{2n}$ of n bits respectively connected through the signal lines 8 to the disc drives $1_1$, $1_2$, $1_3$ —$1n$ and into which the content of the first register 2 is written when all the n bits of the second register 3 are "0". A control circuit, or CPU, 4 controls the disc drives $1_1$, $1_2$, $1_3$ —$1n$, first and second registers 2 and 3, and so on in accordance with a program stored in a ROM (not shown), including writing the content of the first register 2 into the second register 3 when all the flags $F_{21}$, $F_{22}$, $F_{23}$ —$F_{2n}$ of the second register 3 are "0" as mentioned before. A timer 5 counts a seek time for at least one of the disc drives $1_1$, $1_2$, $1_3$ —$1n$ stored in the second register 3 to produce a time over signal when the counted time becomes equal to a predetermined time. A host processor 6 is connected through a bus 9 to the control circuit 4 and to which the time over signal is supplied from the timer 6. In the first and second registers 2 and 3 each flag of "1" is turned "0" when a corresponding one of the disc drives $1_1$, $1_2$, $1_3$ —$1n$ has finished the seek operation.

In the construction of the apparatus for controlling peripheral equipment described above, the first and second registers 2 and 3, control circuit 4, and timer 5 may be fabricated in one semiconductor chip, while the disc drives $1_1$, $1_2$, $1_3$ —$1n$ may be provided external to the semiconductor chip.

Figure 2:
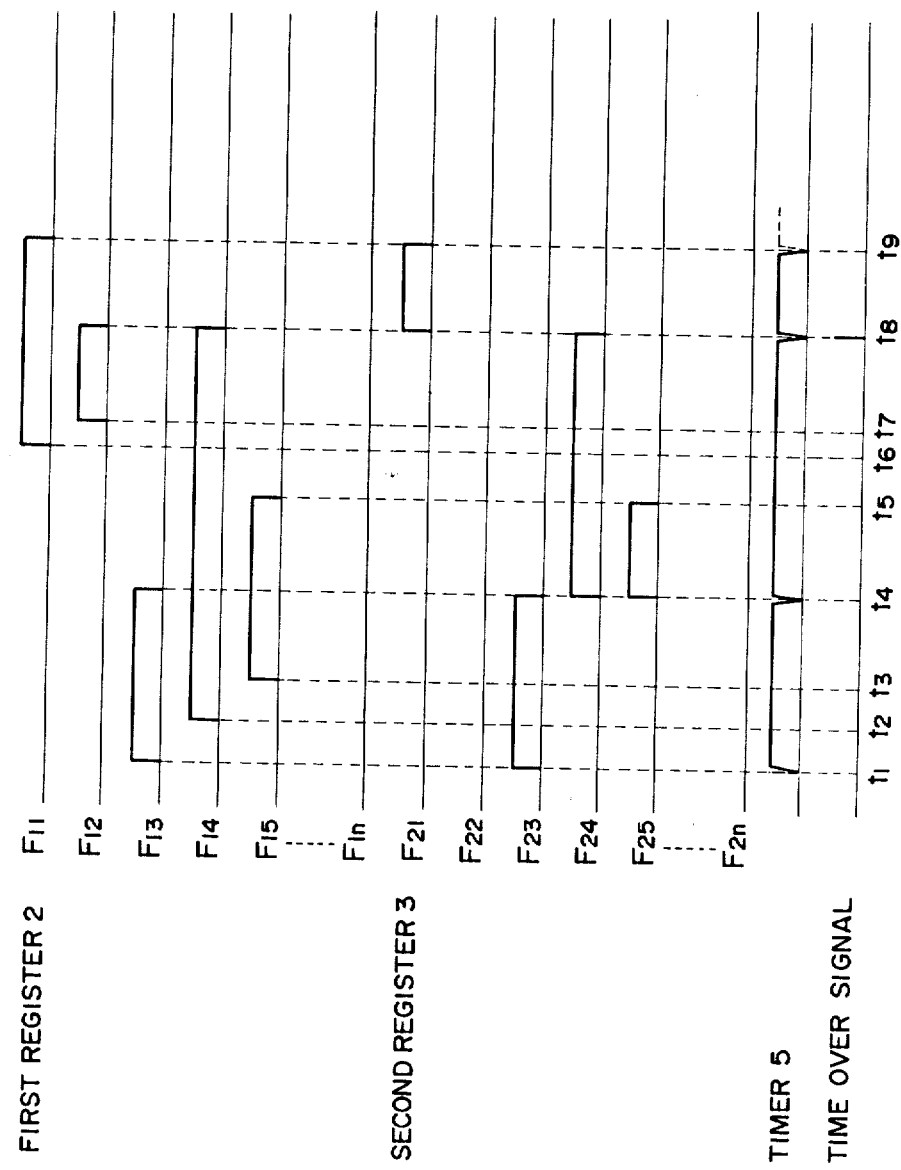
FIG. 2 is a timing chart explaining an operation in the apparatus for controlling peripheral equipment in the first embodiment according to the invention.

In operation, by way of example, it is assumed that there is no disc drive which is under a seek operation at the initial stage (prior to time $t_1$) as shown in FIG. 2 so that all the flags of the first and second registers 2 and 3 are "0". At this stage, the timer 5 has been reset. Next, the control circuit 4 produces a control signal to control the disc drive $1_3$ thereby demanding a seek operation at time $t_1$ so that the flag $F_{13}$ of the first register 2 is turned "1". . At the present stage, all the flags of the second register 3 are "0" so that the content of the first register 3 are "0" so that the control circuit 4 into the second register 3, while the content of the first register 2 including the flag $F_{13}$ remains unchanged. As a result, the flag $F_{23}$ of the second register 3 is turned "1". At this moment, the timer 5 is driven to count a seek time of the disc drive $1_3$. Thereafter, it is assumed that the disc drives $1_4$ and $1_5$ are controlled to conduct a seek operation respectively at times $t_2$ and $t_3$ so that the flags $F_{14}$ and $F_{15}$ of the first register 2 are turned "1". At these times $t_2$ and $t_3$, the content of the first register 2 is not written into the second register 3 because all the flags of the second register 3 are not '0' due to the fact that the flag $F_{23}$ is "1". At time $t_4$, the disc drive $1_3$ finishes the seek operation so that the flags $F_{13}$ and $F_{23}$ of the first and second registers 2 and 3 are turned "0". Consequently, the timer 5 is controlled to be reset before counting a predetermined time so that no time over signal is produced. At this time, all the flags of the second register 3 are "0" so that the content of the first register 2 is written through the control circuit 4 into the second register 3. As a result, the flags $F_{24}$ and $F_{25}$ of the second register 3 are turned "1" so that the timer 5 is controlled to count a seek time again under the condition where at least one flag of the second register 3 is "1". At this occasion, the timer 5 counts a seek time for the disc drives $1_4$ and $1_5$. At time $t_5$, the disc drive $1_5$ finishes the seek operation so that the flags $F_{15}$ and $F_{25}$ of the first and second registers 2 and 3 are turned "0", while the flags $F_{14}$ and $F_{24}$ of the first and second registers 2 and 3 which correspond to the disc drive $1_4$ remain unchanged. Therefore, the timer 5 continues counting a seek time for the disc drive $1_4$ as long as the disc drive $1_4$ is ordered to conduct the seek operation. At times $t_6$ and $t_7$, the disc drives $1_1$ and $1_2$ are controlled to conduct a seek operation so that the flags $F_{11}$ and $F_{12}$ of the first register 2 are turned "1". In spite of the change of the content of the first register 2, the content of the second register 3 remains unchanged because the flag $F_{24}$ thereof is still "1". At time $t_8$, the value of the timer 5 becomes equal to the predetermined time so that a time over signal is produced therein to be supplied to the host processor 6. Coincidentally, the disc drive $1_2$ finishes the seek operation so that the flag $F_{12}$ of the first register 2 is turned "0". The time over of the seek operation is detected in the disc drive $1_4$ so that the flags $F_{14}$ and $F_{24}$ of the first and second registers 2 and 3 are turned "0". Therefore, the content of the first register 2 is written through the control circuit 4 into the second register 3 because all the flags of the second register 3 are "0". As a result, the flag $F_{21}$ of the second register 3 is turned "1" so that the timer 5 is controlled to count a seek time in the same manner mentioned before. At time $t_9$, the disc drive 1 finishes the seek operation so that the timer 5 is controlled to be reset. At the same time, the flags $F_{11}$ and $F_{21}$ of the first and second registers 2 and 3 are turned "0". According to the disc drives $1_1, 1_2, 1_3 - 1n$ controlled by the control circuit 4, the above described sequential operation will be repeated.

Figure 4:
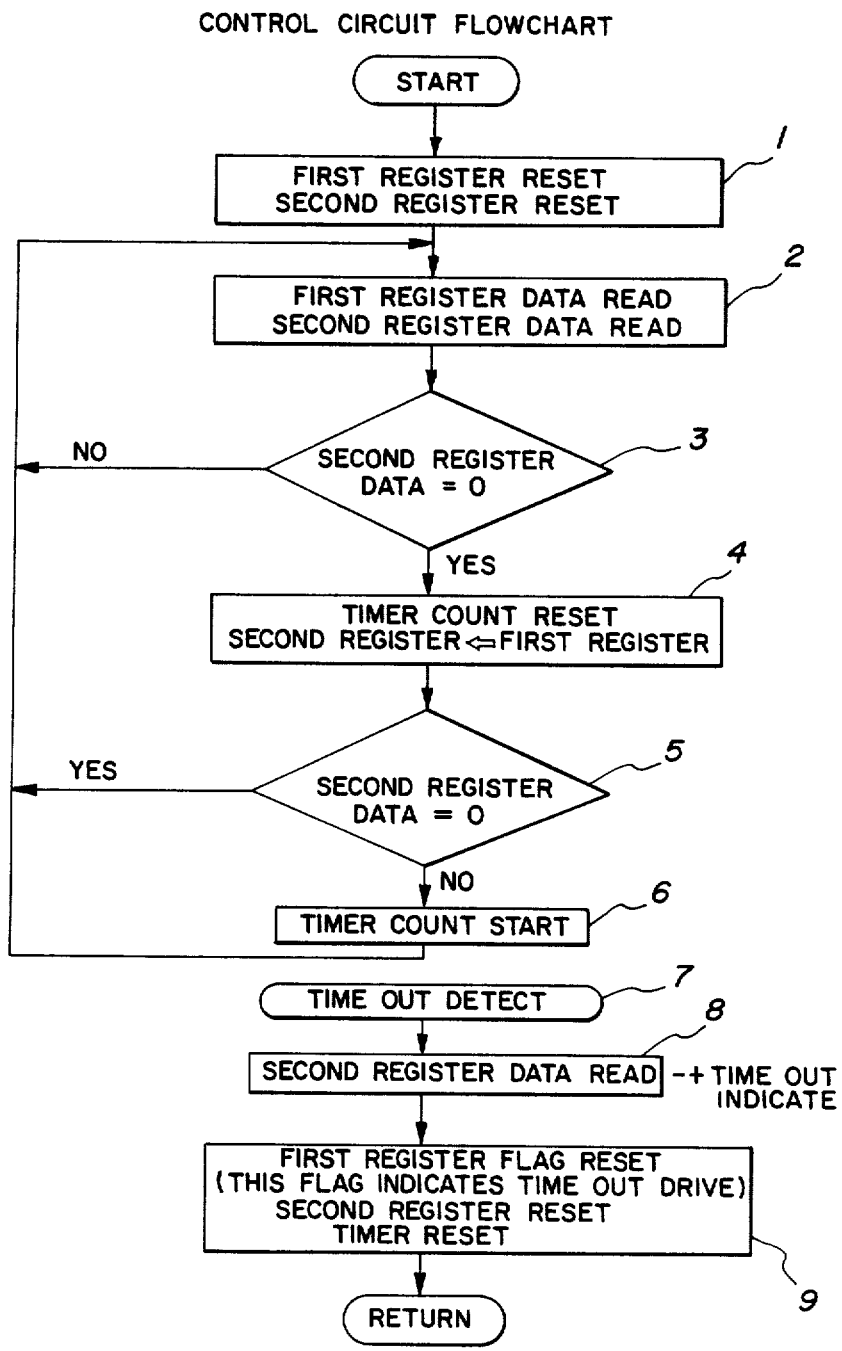
FIG. 4 is a flow chart for explaining operation of the control circuit.

FIG. 4 consolidates the control circuit 4 operation described above. In FIG. 4, when operation starts, the first and second registers 2 and 3 are reset (step 1). Then, the registers 2 and 3 are read (step 2). If data in the second register 3 is all "0" (step 3), the count of the timer 5 is reset, and data in the first register 2 is stored into the second register 3 (step 4). Next, if data in the second register 3 is not all "0" (step 5), the timer 5 is controlled to count (step 6).

When the count of the timer 5 reaches a predetermined time (step 7), a time-over signal is produced. Then, data in the second register 3 is read so that a signal specifying peripheral equipment corresponding to the data in the second register is generated (step 8). Finally, the first and second registers 2 and 3, and the timer 5 are all reset (step 9).

While the first embodiment described above is operating, more than two disc drives whose status is stored in the second register 3 may not reach the designated tracks. Even in such a case, the host processor 6 can distinguish disc drives whose status is stored in the second register 3 from other disc drives not stored therein.

Further, a third register may be provided in addition to the first and second registers 2 and 3 wherein the contents of the second register 3 is written into the third register when all the bits of the third register are "0".

Although disc drives are controlled in the example of the first embodiment, other peripheral equipment like a plurality of tape drives for driving a magnetic tape may be controlled with the invention.

Figure 3:
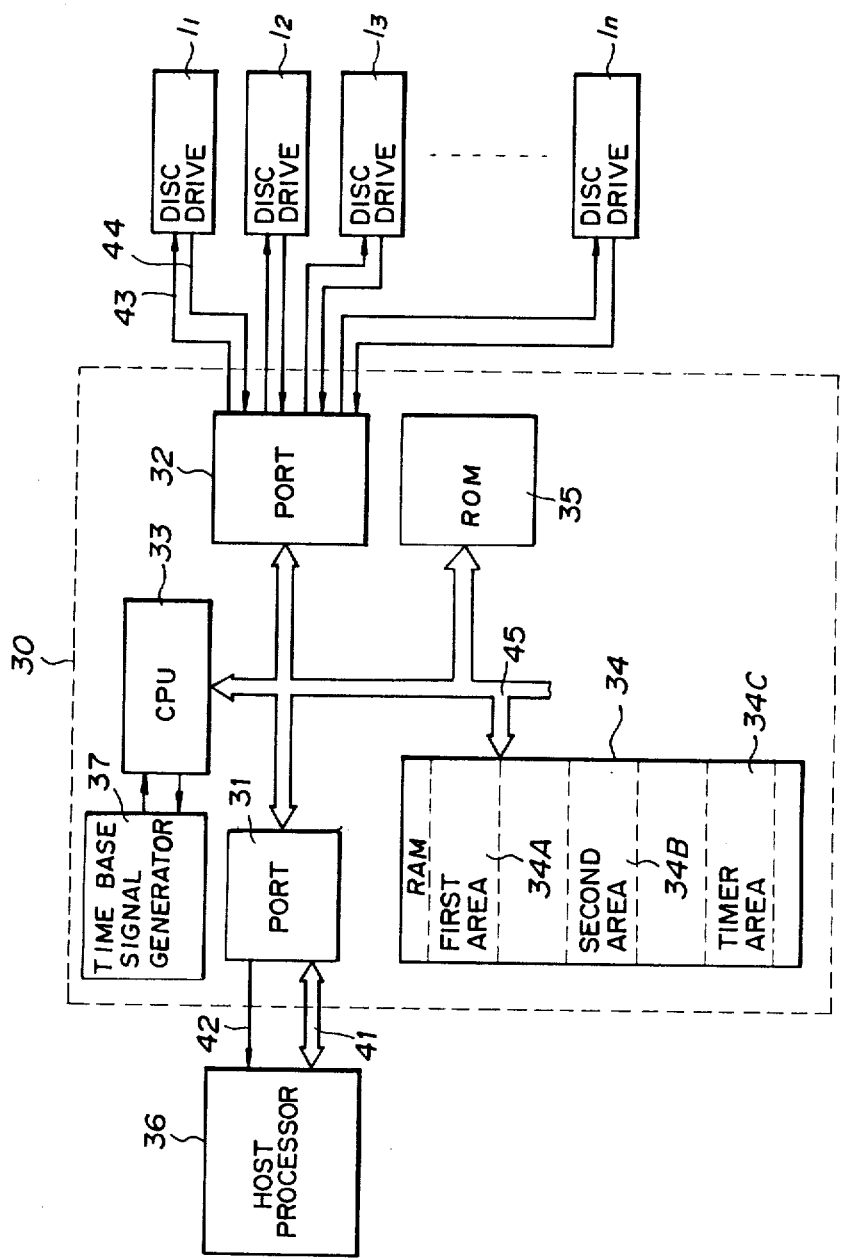
FIG. 3 is a block diagram showing an apparatus for controlling peripheral equipment in a second embodiment according to the invention.

In FIG. 3, there is shown an apparatus for controlling peripheral equipment in a second embodiment according to the invention. The apparatus for controlling peripheral equipment comprises a plurality of disc drives $1_1, 1_2, 1_3 - 1n$, a disc controlling processor 30 which is fabricated as one semiconductor chip, and a host processor 36. The disc controlling processor 30 comprises input and output ports 31 and 32, a CPU 33, a RAM 34, a ROM 35, and a time base signal generator 37. The host processor 36 is connected through a bus 41 and signal line 42 to the port 31, and the disc drives $1_1, 1_2, 1_3 - 1n$ are connected through seek request signal lines 43 and seek operation signal lines 44 to the port 32. In the disc controlling processor 30, the port 31 and 32, CPU 33, RAM 34, and ROM 35 are connected by an internal bus 45. The RAM 34 includes first and second areas 34A and 34B, and timer area 34C respectively corresponding to the first and second registers 2 and 3, and timer 5 described in the first embodiment wherein each of the first and second areas 34A and 34B is of an area associated with the disc drives $1_1, 1_2, 1_3 - 1n$, while the timer area 34C is of an area of bits to be specified in accordance with a predetermined seek time.

In operation, the RAM 34, and ports 31 and 32 are controlled to be reset at the initial stage by the CPU 33. When the control data designating at least one of the disc drives $1_1, 1_2, 1_3 - 1n$ to be driven is supplied through the bus 41 from the host processor 35 to the port 31, the CPU 33 produces a seek request signal which is supplied through the seek request signal line 43 from the port 32 to at least one of the disc drives $1_1, 1_2, 1_3 - 1n$. The disc drive $1k$ ($k=1, 2, 3 - n$) which has received the seek request signal is controlled to conduct the seek operation such that a seek operation signal which is supplied through the seek operation signal line 44 to the port 32 is produced therein. Then, the seek operation signal is written into a bit corresponding to the disc drive $1k$ in the first area 34A of the RAM 34 so that the subject bit becomes "1". The CPU 33 scans the ports 31 and 32, and RAM 34 at a predetermined period so that designated disc drives among the disc drive $1_1$, $1_2$, $1_3$ —$1_n$ are controlled to conduct the seek operation in accordance with the scanning of the port 31, and the RAM 34 is controlled to store seek operation signals in accordance with the scanning of the port 32. In the RAM 34, in a case where at least one bit of the first area 34A is "1", and all the bits of the second area 34B are '0', the content of the first area 34A is written into the second area 34B, while the first area 34A remains unchanged in its stored condition. At the same time, the timer area 34C is controlled to conduct a timer operation in which the content thereof is increased at each predetermined period by one so that a time over signal is produced in the CPU 33 when all the bits of the timer area 34C become "1" resulting in an over flow in that area. Before timer operation, the time base signal generator 37 supplies a time base signal to the CPU 33 so that an interrupt occurs in the CPU 33. The timer operation in which the content thereof is increased is performed by counting the time base signal which has generated at the predetermined period from time base signal generator 37. After the over flow is occurred in the timer area 34, the interrupt is finished in the CPU 33. When the disc drive 1k finishes the seek operation, the seek operation signal ceases to be produced so that the bit corresponding to the disc drive 1k become "0" in the first and second areas of the RAM 34. When the bit in the second area 34B becomes "0", the timer area 34C is controlled to finish the timer operation so that the content thereof is reset. On the other hand, if at least one bit of the second area 34B is "1", the timer area 34C continues the timer operation. If over flow occurs in the timer area 34C, a time over signal is produced in the CPU 33 to be supplied from the port 31 through the signal line 42 to the host processor 36. In the same manner as described in the first embodiment, the content of the first area 34A is written into the second area 34B, when all the bits of the second area 34B are "0" whereby the timer area 34C is controlled to conduct the timer operation again. As apparent from the first embodiment, repeated explanations will not be repeated in the second embodiment.

Although the invention has been described with respect to specific embodiments for a complete and clear the invention is not limited to those of specific embodiments but is to be construed as embodying all modification and alternative constructions that may occur to one skilled in the art which fairly fall within the basic teaching herein set forth.

What is claimed is:

1. An apparatus for controlling peripheral equipment, said apparatus comprising:
    driving means for driving a plurality of peripheral equipment,
    first storing means for storing first data indicating which peripheral equipment is under operation,
    second storing means for storing second data,
    a timer counting a time and producing a time over signal when said time becomes equal to a predetermined time, and
    control means, connected to said driving means, said first and second storing means, and said timer, for controlling operation of said driving means, said first and second storing means, and said timer, said control means controlling said second storing means to store said first data which is stored in said first storing means into said second storing means when all of said second data has a predetermined value, said control means controlling said timer to start counting when any of said second data has a value other than said predetermined value.

2. An apparatus for controlling peripheral equipment according to claim 1, wherein said plurality of peripheral equipment are disc drives each driving a head for writing information into a disc and reading information therefrom,
    said first and second storing means are registers each having a specified number of bits, said specified number being equal to a number of said plurality of peripheral equipment, each of said bits being "1" when a corresponding one of said disc drives is under a seek operation, and
    said timer counts a seek time.

3. An apparatus for controlling peripheral equipment according to claim 1, wherein said plurality of peripheral equipment are disc drives each driving a head for writing information into a disc and reading information therefrom,
    said first and second storing means are areas of a random access memory, each area having a specified number of bits, said specified number being equal to a number of said plurality of peripheral equipment, each of said bits being "1" when a corresponding one of said disc drives is under a seek operation, and
    said timer is a third area of said random access memory whose content is periodically increased by one bit.

4. An apparatus for controlling peripheral equipment according to claim 1, said apparatus further comprising,
    third storing means for storing said second data received from said second storing means when third data, stored in said third storing means, has a second predetermined value, part of said second data received from said second storing means being erased when one of said plurality of peripheral equipment finishes operation,
    wherein said timer counts time when said second data received from said second storing means is stored in said third storing means.

5. An apparatus for controlling peripheral equipment, said apparatus comprising,
    driving means for driving a plurality of disc drives each driving a head for writing information into a disc and reading information therefrom,
    first storing means for storing first data indicating which of said plurality of disc drives are under operation,
    second storing means for storing second data,
    a timer counting a time and producing a time over signal when said time becomes equal to a predetermined time, and
    control means, connected to said driving means, said first and second storing means, and said timer, for controlling operation of said driving means, said first and second storing means, and said timer, said control means controlling said second storing means to store said first data which is stored in said first storing means into said second storing means when all of said second data has a predetermined value, said control means controlling said timer to start counting when any of said second data has a value other than said predetermined value.

* * * * *